(12) United States Patent
Taylor

(10) Patent No.: US 10,239,463 B2
(45) Date of Patent: *Mar. 26, 2019

(54) LIFT STORAGE DEVICE FOR A VEHICLE INCLUDING LIFT ASSIST

(71) Applicant: David Ralph Taylor, Princeton, IL (US)

(72) Inventor: David Ralph Taylor, Princeton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,490

(22) Filed: May 7, 2018

(65) Prior Publication Data

US 2019/0047482 A1 Feb. 14, 2019

Related U.S. Application Data

(63) Continuation of application No. 15/673,667, filed on Aug. 10, 2017, now Pat. No. 9,963,081.

(51) Int. Cl.
| | |
|---|---|
| *B60R 9/06* | (2006.01) |
| *B60R 11/06* | (2006.01) |
| *B66F 3/22* | (2006.01) |
| *B66F 7/08* | (2006.01) |
| *B66F 7/06* | (2006.01) |
| *B66F 7/28* | (2006.01) |
| *B60R 11/00* | (2006.01) |

(52) U.S. Cl.
CPC .............. *B60R 9/065* (2013.01); *B60R 11/06* (2013.01); *B66F 3/22* (2013.01); *B66F 7/0666* (2013.01); *B66F 7/08* (2013.01); *B66F 7/28* (2013.01); *B60R 2011/008* (2013.01); *B60R 2011/0092* (2013.01)

(58) Field of Classification Search
CPC ... B60R 11/06; B60R 9/065; B60R 2011/008; B60R 2011/0092; B66F 7/065
USPC ...................... 224/404; 296/37.6; D12/414.1
See application file for complete search history.

(56) References Cited

U.S. PATENT DOCUMENTS

| | | | | |
|---|---|---|---|---|
| 2,629,644 | A * | 2/1953 | Heys ...................... | A01K 97/06 312/249.11 |
| 4,328,989 | A * | 5/1982 | Childers .................. | B60P 3/32 220/521 |
| D305,315 | S * | 1/1990 | Fletcher .................... | D12/414.1 |
| 4,917,430 | A * | 4/1990 | Lawrence ................. | B60R 7/04 224/281 |

(Continued)

*Primary Examiner* — Justin Larson
(74) *Attorney, Agent, or Firm* — Erickson Law Group, PC

(57) ABSTRACT

A storage device for a vehicle is disclosed. In one embodiment, the storage device has an exterior housing, an interior container, and a scissor lift mechanism. The scissor lift mechanism is located within the exterior housing and is operatively connected to the interior container. The scissor lift mechanism has a raised position and a lowered position. The interior container is within the exterior housing when the scissor lift mechanism is in the lowered position. The interior container is at least partially located outside the exterior housing when the scissor lift mechanism is in the raised position. The scissor lift mechanism includes crossed bars that pivot about a bolt or pin in scissor-like fashion to raise or lower the interior container. An actuator pivots the cross bars to the raised position and is oriented and connected to the crossed bars to have an upward vertical force component throughout the raising operation.

20 Claims, 18 Drawing Sheets

(56) References Cited

U.S. PATENT DOCUMENTS

| | | | | |
|---|---|---|---|---|
| 4,936,624 A * | 6/1990 | West | B25H 3/021 | 224/282 |
| 5,016,858 A * | 5/1991 | Mitchell | B66F 7/0625 | 254/122 |
| 5,303,969 A * | 4/1994 | Simnacher | B60R 11/06 | 224/494 |
| D353,046 S * | 12/1994 | Whitaker | D12/414.1 | |
| 5,634,577 A * | 6/1997 | Pearson, Jr. | B60R 11/06 | 224/242 |
| 6,155,770 A * | 12/2000 | Warhurst | B60P 1/6445 | 414/347 |
| 6,467,830 B1 * | 10/2002 | Cortright | B60R 13/06 | 296/26.04 |
| 6,626,479 B1 * | 9/2003 | Skoug | B60R 9/00 | 224/404 |
| 6,695,375 B1 * | 2/2004 | May | B60R 9/00 | 224/281 |
| D488,428 S * | 4/2004 | Greene | D12/414.1 | |
| 6,929,303 B1 * | 8/2005 | Sharples | B60J 7/1621 | 296/100.05 |
| 7,052,066 B2 * | 5/2006 | Emery | B60R 11/06 | 296/37.1 |
| 7,182,177 B1 * | 2/2007 | Simnacher | B66F 3/12 | 187/211 |
| 7,249,771 B1 * | 7/2007 | Brennan | A47J 37/0704 | 280/35 |
| 7,354,089 B2 * | 4/2008 | Hobrecht | B60J 7/1614 | 296/183.1 |
| 8,007,024 B2 * | 8/2011 | Kealy | B60J 7/1614 | 296/100.02 |
| 8,038,195 B1 * | 10/2011 | Hutcheson | B60R 9/00 | 296/136.04 |
| 8,162,190 B2 * | 4/2012 | Hanson | B60R 9/00 | 224/404 |
| 8,393,665 B2 * | 3/2013 | Villano | B60R 11/06 | 224/403 |
| 8,636,182 B1 * | 1/2014 | Gordon | B60R 9/00 | 224/282 |
| 9,481,403 B1 * | 11/2016 | Johnson | B62D 33/023 | |
| 2004/0207226 A1 * | 10/2004 | Johnson | B60P 3/14 | 296/50 |
| 2008/0191506 A1 * | 8/2008 | Huotari | A47B 37/00 | 296/37.6 |
| 2009/0127306 A1 * | 5/2009 | Mims | B60P 3/0257 | 224/404 |
| 2009/0189403 A1 * | 7/2009 | Voglmayr | B60P 1/02 | 296/3 |
| 2010/0051662 A1 * | 3/2010 | Hanson | B60R 9/00 | 224/404 |
| 2011/0037286 A1 * | 2/2011 | Nebel | B60R 9/00 | 296/37.6 |
| 2011/0284602 A1 * | 11/2011 | Lamouroux | B60R 11/06 | 224/402 |
| 2012/0187013 A1 * | 7/2012 | Gapinski | B25H 3/021 | 206/373 |
| 2012/0200106 A1 * | 8/2012 | Villano | B60R 9/065 | 296/37.6 |
| 2014/0231477 A1 * | 8/2014 | Perkins | B60R 11/06 | 224/404 |

\* cited by examiner

LIFT STORAGE DEVICE FOR A VEHICLE INCLUDING LIFT ASSIST This application is a continuation of U.S. patent application Ser. No. 15/673,667, filed Oct. 10, 2017, which is herein incorporated.

FIELD OF THE INVENTION

This invention relates in general to vehicle storage devices.

BACKGROUND OF THE INVENTION

Pickup trucks comprise a cab and a bed. The bed may comprise raised sides with an open top. It is known to provide tool boxes for use in a bed of a pickup truck.

Many tool boxes for use in the bed of a pickup truck require the user to bend down to reach down in the tool box to retrieve items from the tool box. While the storage of tools within the tool box in the bed of a pickup truck may be convenient for transport, tools may not be conveniently located for easy removal from or storage within the tool box.

U.S. Pat. No. 5,303,969 (the '969 patent) and U.S. Pat. No. 7,182,177 (the '177 patent) disclose a tool box for locating over a wheel well of a truck bed. A jack is provided to move the tool box between a raised and a lowered position. However, the devices of the '969 patent and the '177 patent do not provide a housing that protects the jack from the environment and from materials that may be loaded into the bed of the truck.

U.S. Pat. No. 6,626,479 (the '479 patent) discloses a tool box that extends across the bed of a truck. A jack is provided to move the tool box from a lowered position to a raised position. However, the device of the '479 patent does not provide a housing that protects the jack components from the environment and from materials that may be loaded into the bed of the truck. Further, the device of the '479 patent provides long tubes for housing a portion of the lift mechanism and the tubes interrupt long vertical spaces of the container.

U.S. Patent App. Pub. No. 2011/0284602 (the '602 publication) discloses a tool box for a bed of a truck. Jacks raise and lower the tool box. However, the device of the '602 publication does not provide a housing that protects the jack components from the environment and from materials that may be loaded into the bed of the truck.

The devices of U.S. Pat. Nos. 8,636,182 and 6,929,303 do not provide a housing that protects the jack components from the environment and from materials that may be loaded into the bed of the truck.

U.S. Patent App. Pub. 2010/0051662 and U.S. Pat. No. 4,936,624 disclose truck tool boxes having a raisable portion. However, the raisable portions do not raise completely out of the tool box nor do they raise in a level manner. Each of these devices comprise a tilting lift mechanism, which has the disadvantage of causing the contents to slide to the back of the raisable portion away from the user. This makes it hard to maintain organization within the raisable portion and more difficult for the user to reach the desired items in the raisable portion.

The present inventor recognized the need for an improved lifting container for a vehicle. The present inventor recognized the need for a lifting container that allows the user to deposit and remove items from a position more convenient for the user. The present inventor recognized the need for a lifting container that provides a housing for the lift mechanism to protect the mechanism from the environment and contents that may be loaded into the bed of the truck. The present inventor recognized the need for a lifting container that lifts vertically from an exterior housing so that the contents in the lifting container are not shuffled by tilting.

SUMMARY OF THE INVENTION

A lift storage device for a truck bed is disclosed. In one embodiment, the device comprises an exterior housing, an interior container, and a scissor lift mechanism.

The exterior housing comprises sidewalls, a lid, a left wing, and a right wing. The left wing is configured to rest on a left side rail of the truck bed and the right wing is configured to rest on the right side rail of the truck bed so that the exterior housing extends across the truck bed.

The scissor lift mechanism is located within the exterior housing and is operatively connected to the interior container. The scissor lift mechanism comprises a raised position and a lowered position. The interior container is within the exterior housing when the scissor lift mechanism is in the lowered position. The interior container is at least partially located outside the exterior housing when the scissor lift mechanism is in the raised position. The scissor lift mechanism maintains the interior container in the same orientation when the scissor lift mechanism is in the raised position and when the scissor lift mechanism is in the lowered position.

A drive mechanism is operatively connected to the scissor lift mechanism to drive the scissor lift mechanism between the lowered position and the raised position.

The drive mechanism includes an extendable member that is oriented to exert an upward lift assist on the interior container in addition to closing the scissor lift mechanism, to move the interior container from the lowered position to the raised position.

In some embodiments, the interior container comprises a plurality of drawers located on a left side, a right side, and/or a front face of the interior container.

Numerous other advantages and features of the present invention will become readily apparent from the following detailed description of the invention and the embodiments thereof, from the claims, and from the accompanying drawings.

DETAILED DESCRIPTION

Figure 1:
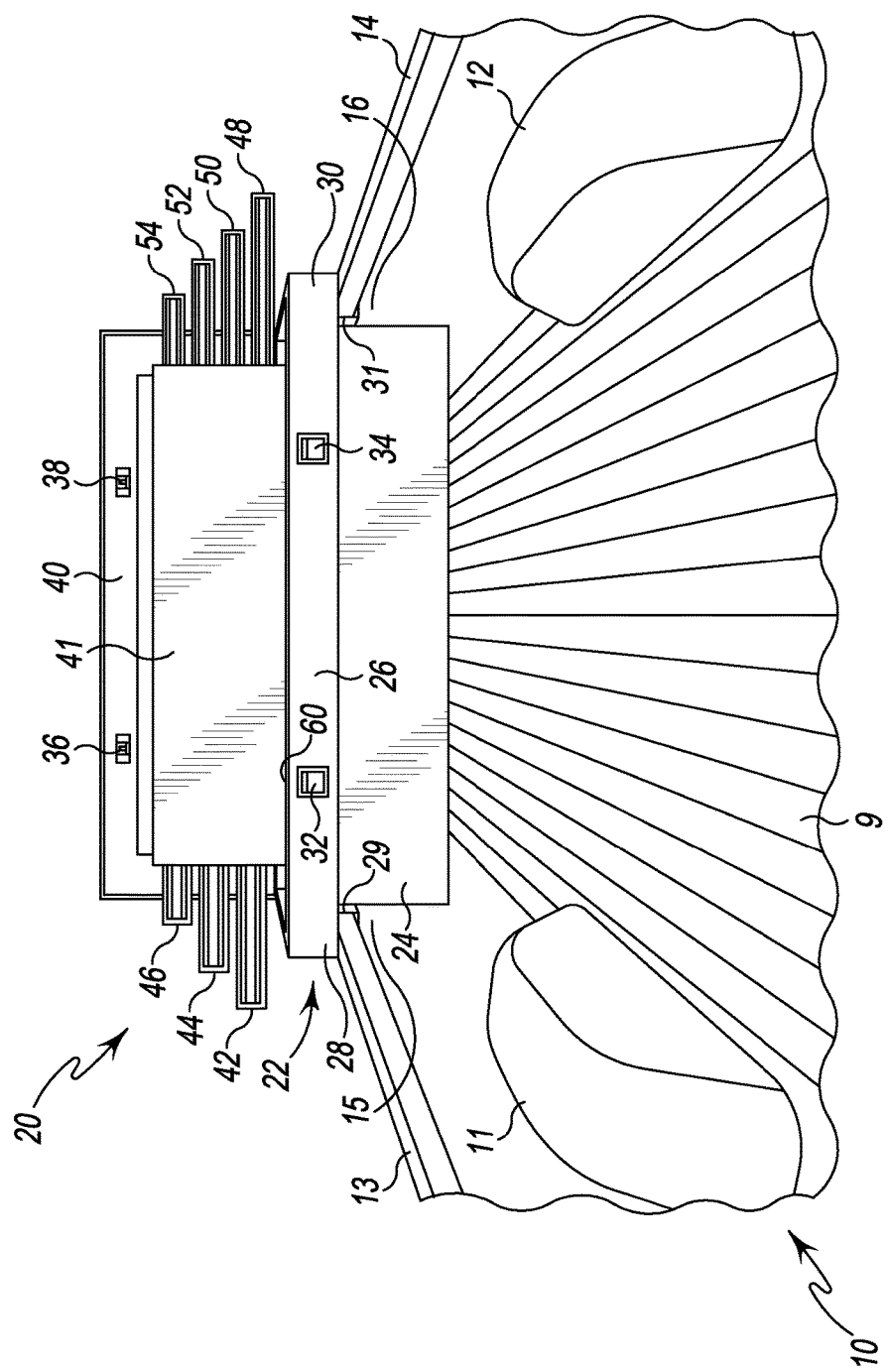
FIG. 1 is a front view of a storage device for a vehicle shown mounted in the bed of a truck.

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. patent application Ser. No. 15/183,977, filed Jun. 16, 2016.

FIG. 1 shows a storage device 20 for a truck. The storage device 20 mounted in the bed 10 of the truck. The storage device 20 is mounted so the length of the storage device extends across the bed of the pickup truck between a first side rail 13 and a second side rail 14 of the bed 10 adjacent the front boundary of the bed 10 and adjacent the cab 17 of the truck.

The storage device 20 comprises an exterior container 22, an interior container 41, and a lift mechanism 131. The lift mechanism 131 is configured to raise and lower the interior container 41 relative to the exterior container 22.

The exterior container 22 comprises a base 24, a top portion 26, and a lid 40. The base 24 comprises a front wall 106, a left side wall 112, a right side wall 110, and a back wall 108. The top portion 26 extends from the base.

The top portion 26 comprises a left wing 28 and a right wing 30. The left-wing 28 is configured to be located over the left side rail 13 of the bed 10. The right wing 30 is configured to be located over the right side rail 14 of the bed 10. The left and right wings support the exterior container on the respective side rails of the bed above the bed floor 9. In some embodiments, the exterior container may rest on the bed floor as well.

Left clamp 29 and right clamp 31 extend from the respective left wing and right wing and under the respective left rail 13 and right rail 14 to secure the exterior container 22 to the bed rails by clamping force about the rails 13 and 14. The clamping force prevents the movement of the exterior container relative to the truck bed.

Figure 5:
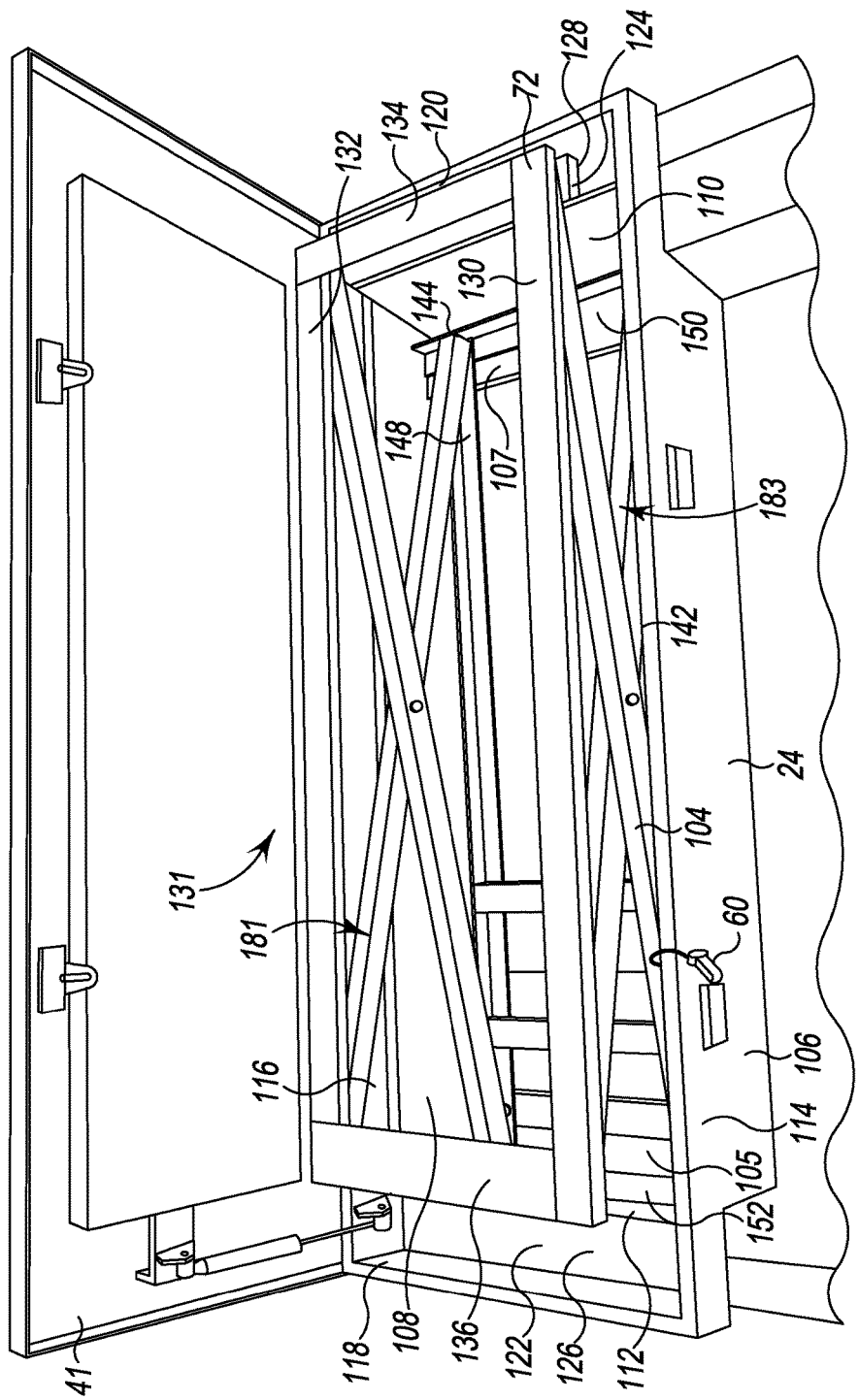
FIG. 5 is a perspective top view of the storage device of FIG. 1 with the interior container removed to view underlying components.

As shown in FIG. 5, the top portion 26 comprises a front wall 114, a back wall 116, a left side wall 118, and a right side wall 120. In some embodiments, such as the embodiment shown in FIG. 1, the top portion is wider than the base in all horizontal directions. Therefore, the front wall 114 is positioned rearward of the front wall 106. The back wall 116 is positioned forward relative to the back wall 108. The left side wall 118 is spaced leftward relative to the left side wall 112. The right side wall 120 is spaced rightward relative to the right side wall 110. Therefore the horizontal area in the top portion 26 is greater than the horizontal area in the base 24. In some embodiments, the top portion is wider only in the right and left horizontal directions, but not in the front and rear horizontal directions.

As shown in FIG. 1, a vertical depth of the base 24 is greater than the vertical depth of the top portion 26. Therefore, more of the exterior container 22 is located below the top of the side rails 13 and 14 than is located above.

The lid 40 is attached to the base by a hinge. The hinge connects to a first side of the lid. The hinge also connects to an exterior surface of the back wall 116 of the top portion 26. The hinge allows the lid to pivot between an open position as shown in FIGS. 1 and 5 and a closed position (not shown) where the lid rests on or adjacent the top edge 27 of the top portion 26. When the lid is in the closed position, the exterior housing provides an enclosed space containing the interior container 41 and the lift mechanism 131.

When the lid is in the closed position, the male elements 36, 38 engage with the female latches 32, 34 to releasably secure the lid in the closed position. The female latches 32, 34 comprise handles which when pulled upward released the latch mechanism and allow the male elements 36, 38 to withdraw from the female latches.

Figure 2:
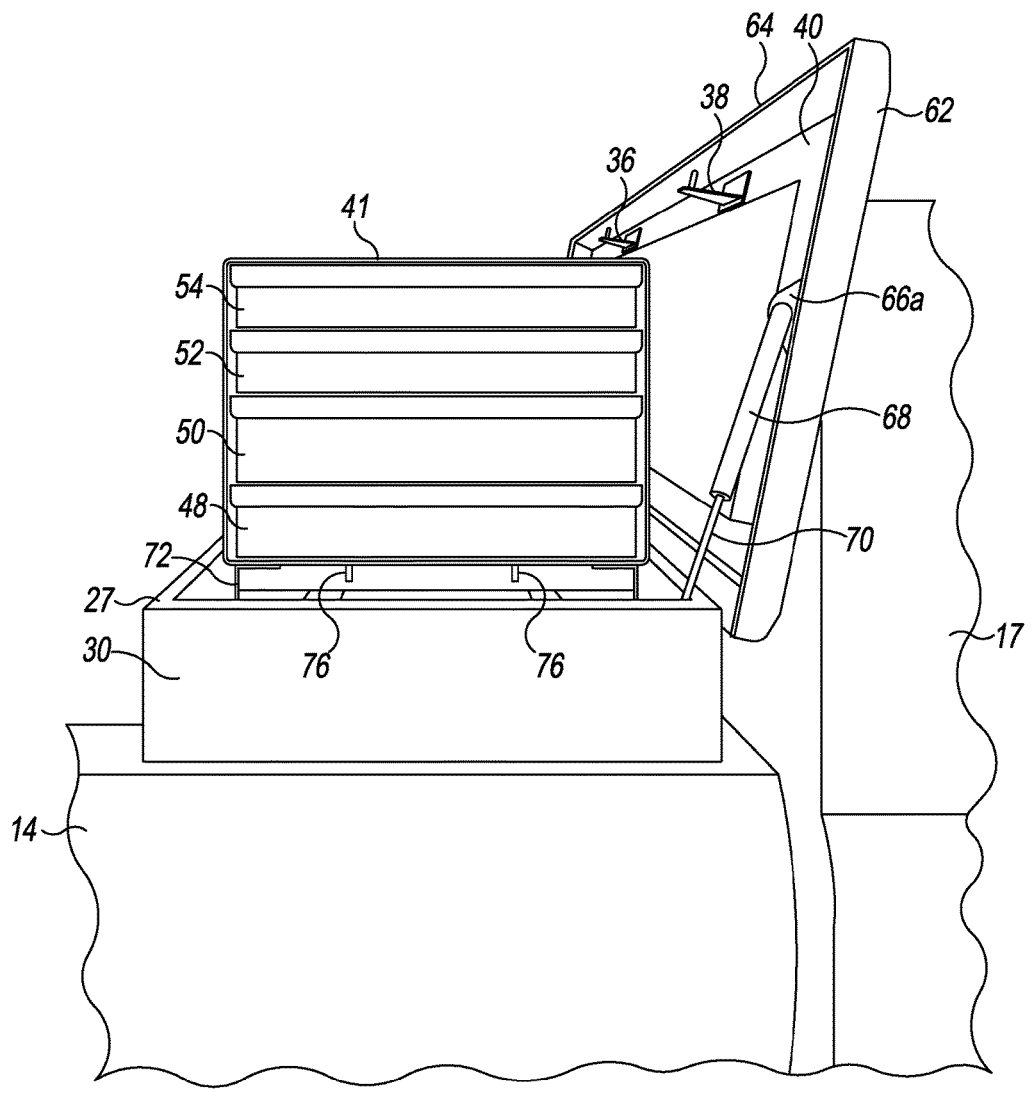
FIG. 2 is a right side view of the storage device of FIG. 1.
Figure 3:
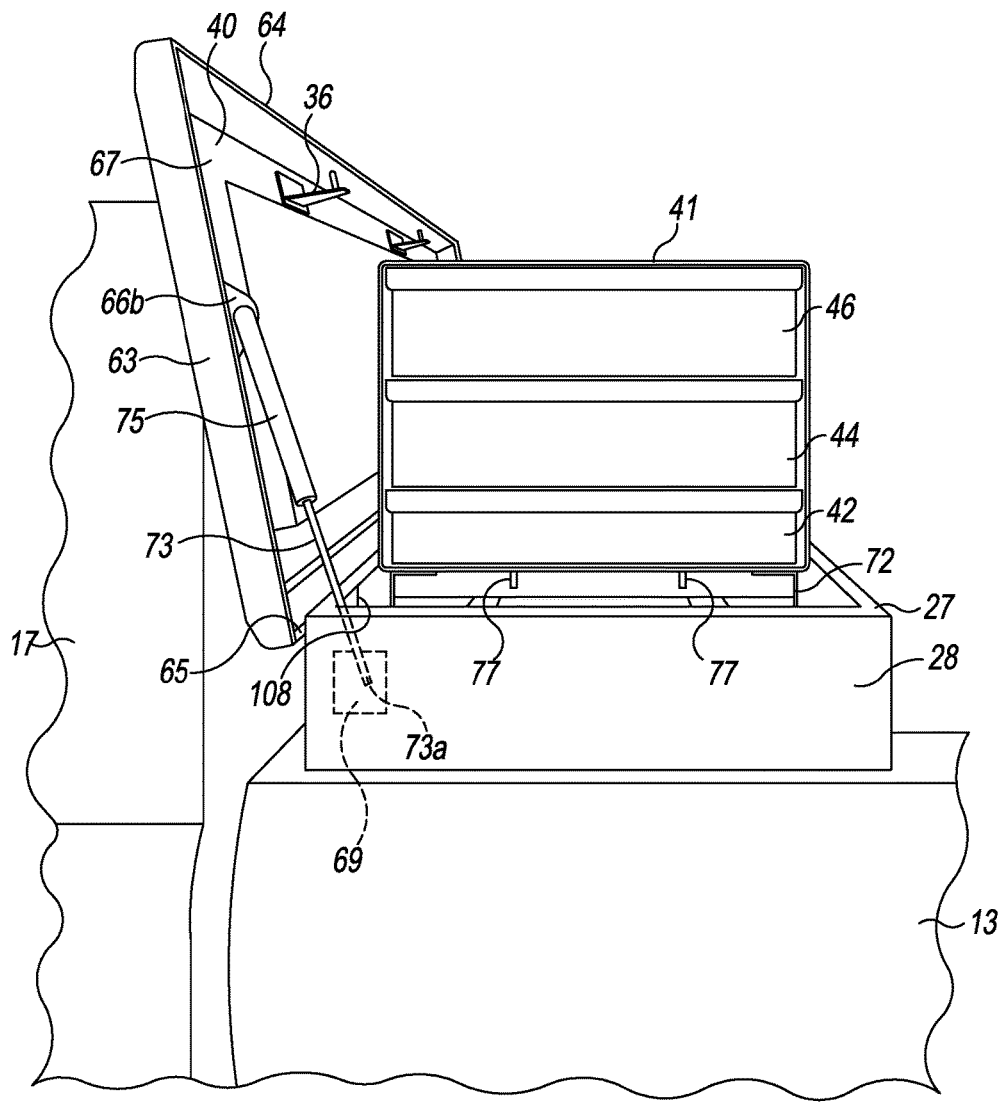
FIG. 3 is a left side view of the storage device of FIG. 1.

As shown in FIGS. 2 and 3, the lid may comprise a perimeter skirt 62, 63, 64, 65, which extends away from the main portion 67. The right and left sides of the lid comprise a right cylinder mount 66a and a left cylinder mount 66b, respectively. The mounts 66a, 66b may be plates extending from the main portion 67 and comprising an aperture for receiving a pivotable attachment to a right lift cylinder 68 and a left lift cylinder 75, respectively. At an end 73a (right side not shown) opposite the attachment to the lid, the lift cylinder 75 pivotal attaches to a mounting tab 69 (right side not shown) of the top portion 26 which extends from the back wall 116.

Figure 7:
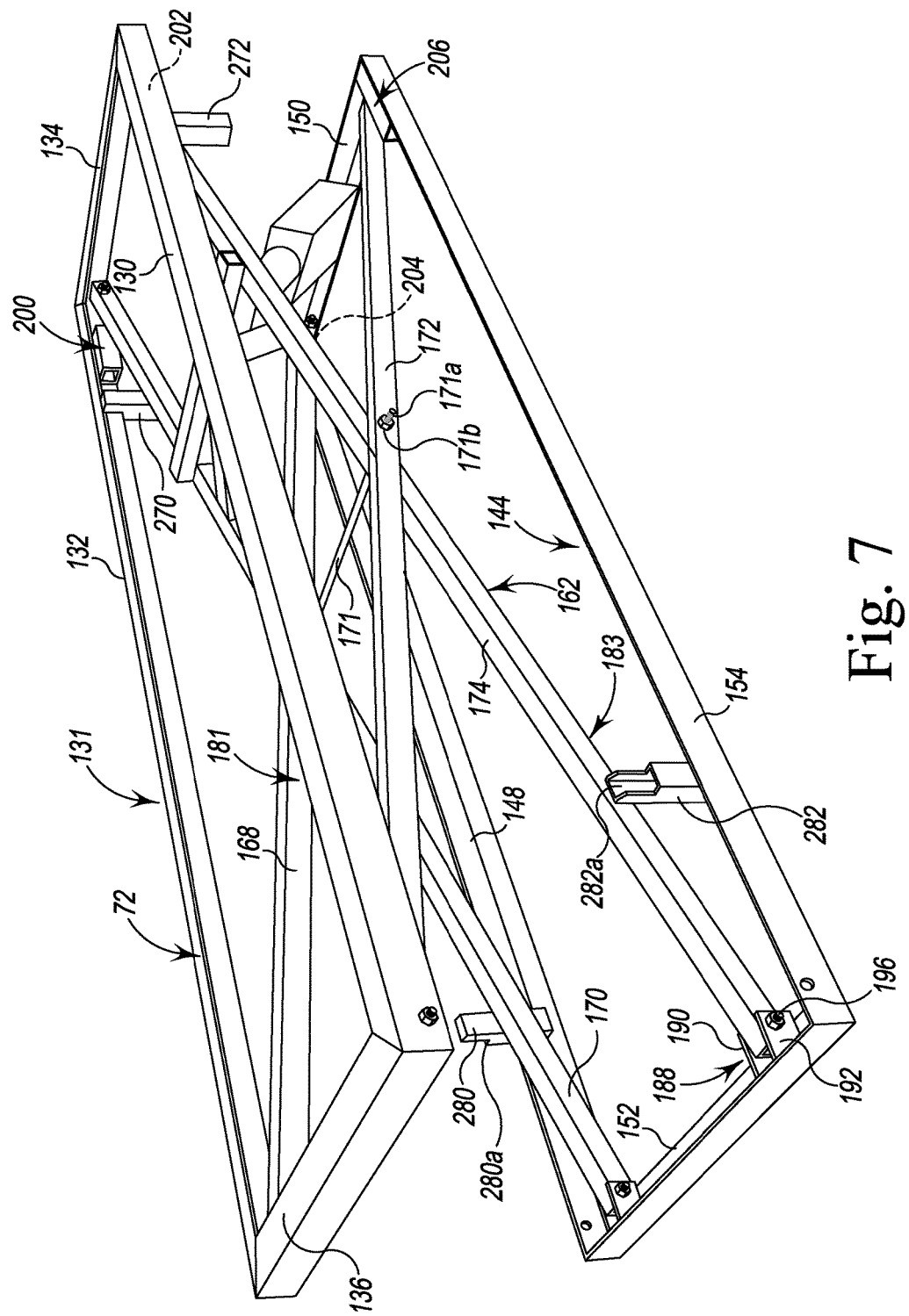
FIG. 7 is a perspective isometric view of a lift mechanism of the storage device of FIG. 1.

As shown in FIG. 5, the lift mechanism 131 is supported on the floor 104 of the base 24. As shown in FIG. 7, the lift mechanism 131 comprises an upper frame 72, a lower frame 144, a scissor mechanism 162, and a drive mechanism 218. Spacing blocks 105, 107 may be provided at opposite sides of the base to support the lower frame 144 above the floor 104 and to space the lower frame 144 from the floor 104.

The interior container 41 is supported on the upper frame 72 of the lift mechanism 131. The interior container 41 may be attached to the upper frame on opposite sides by bolts or studs 76, 77 as shown in FIGS. 2 and 3. The bolts penetrate holes in the upper frame 72 and nuts are fastened from the underside to secure the interior container 41 to the upper frame 72. Other means and devices for connecting the interior container to the upper support frame may be provided, such as welding, clamping, etc.

In one embodiment, the left end and the right end of the interior container 41 comprise drawers 42, 44, 46, 48, 50, 52, 54 as shown in FIGS. 1 to 4. The figures show that the left side of the interior container has three drawers and the right side has four drawers. However in other embodiments, each side may contain any number of drawers. In some embodiments, the right side contains the same number of drawers as the left side. In some embodiments, each of the right and left sides comprise between 1 and 10 drawers. The height of each drawer can be, but need not be, the same. The number of drawers and their respective height may be determined by the area which is available within the exterior container between the floor 104 and the lid 40, when the lid is in the closed position.

Figure 4:
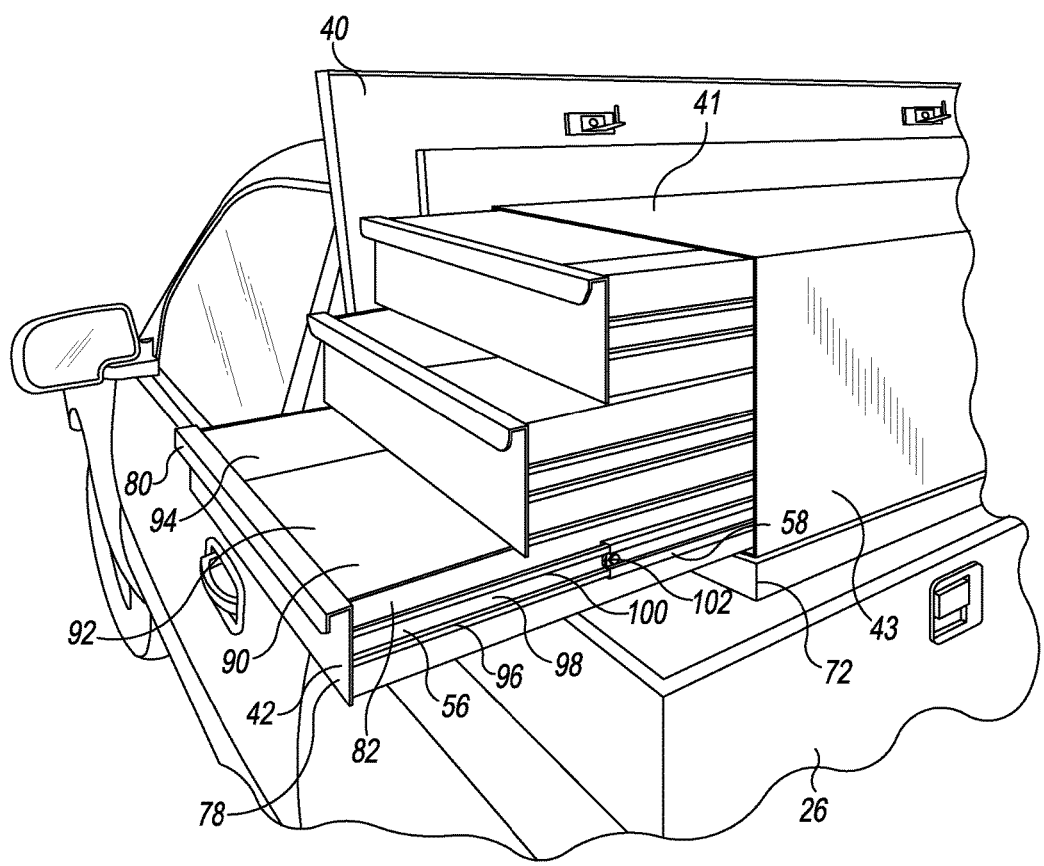
FIG. 4 is a perspective left side view of the storage device of FIG. 1.

Each of the drawers may comprise a handle as shown in FIGS. 2 through 4. FIG. 4 shows a perspective view of the drawers on the left side. Drawer 42 comprises an interior space 90 defining a semi enclosed space by a front wall 78, a first side wall 94, a second side wall 82, a rear wall (not shown), and a floor 92. The drawer 42 comprises a handle 80. The drawers are slidably connected to a body 43 of the interior container 41. The connection of the drawers allows them to slide in and out of the body 43. In some embodiments, the slide path of the drawers is horizontal or substantially horizontal.

The drawers may be slidably attached to the body 43 on slide tracks such as those which are known in the art. FIG. 4 shows one embodiment of the slide track. The slide tracks are provided on both sides of each drawer. FIG. 4 shows a first slide track 56 of the drawer 42. The first slide track 56 comprises a lower rail 99 spaced apart from an upper rail 100 by a recessed region 98. The first slide track 56 is fixed to the drawer 42. The first slide track 56 is received in a second track 58. A second slide track 58 is fixed to the body 43. The second slide track 58 comprises a roller 102 that is positioned between the lower rail 99 and the upper rail 100 of the first track 56. The roller facilitates the sliding of the first slide track relative to the second slide track and thereby the drawer relative to the body 43. The other drawers 44, 46, 48, 50, 52, 53 are slidably attached on both sides to the body in the same manner as described above with respect to drawer 42.

Figure 6:
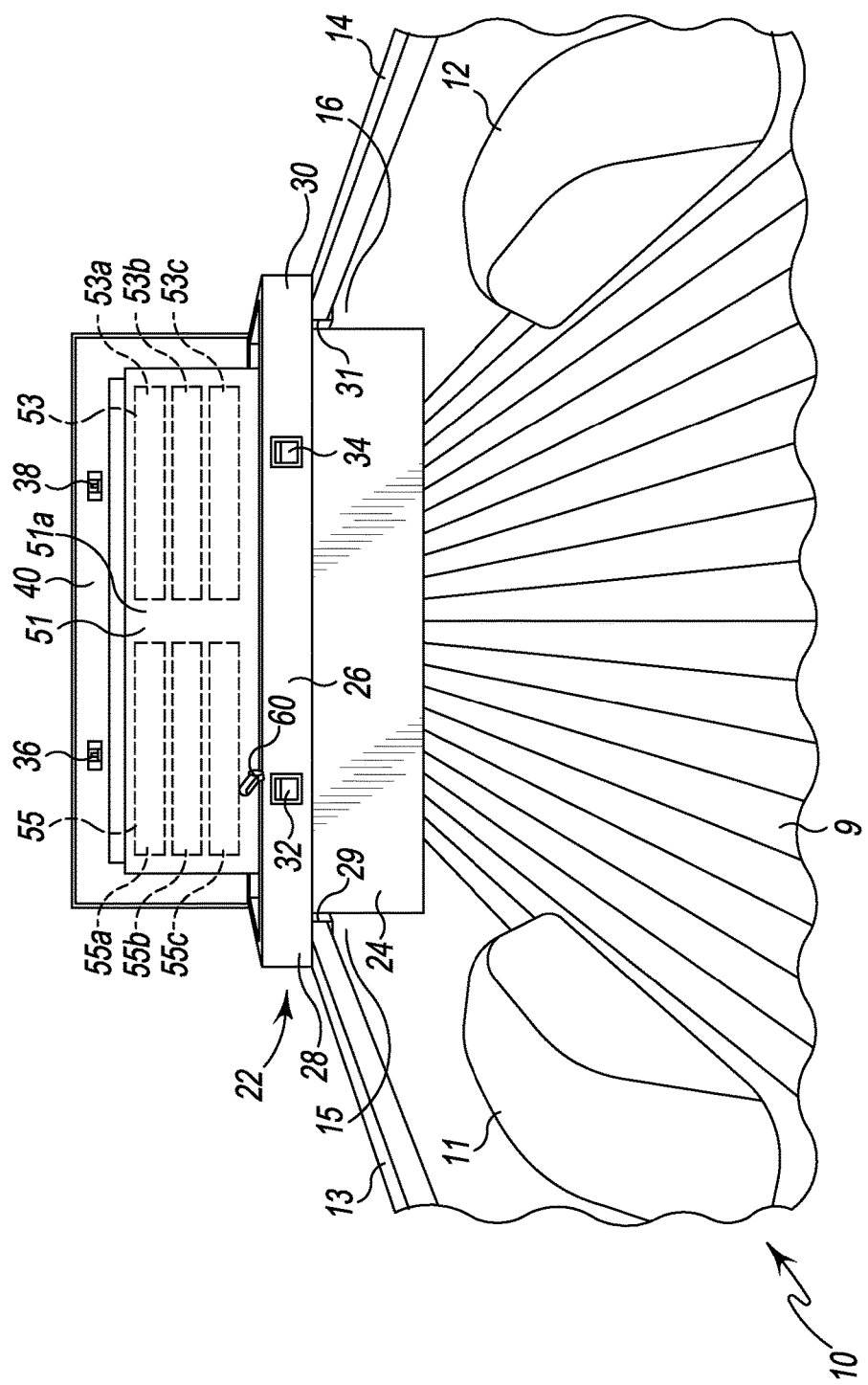
FIG. 6 is a front view of the storage device of FIG. 1 with a second embodiment interior container.

A second embodiment interior container 51 is shown in FIG. 6. Container 51 is identical to container 41 except that container 51 has drawers that extend from the front face 51a of the container rather than from the left and right sides as is provided with container 41. A right drawer bank 53 comprises drawers 53a, 53b, 53c. A left drawer bank 55 comprises drawers 55a, 55b, 55c. The drawers slide rearward and forward relative to the front face 51a on slide tracks of the type described with respect to container 41. The container 51 will have vertical supports (not shown) on opposite sides of each drawer for attaching the slide tracks and thereby supporting the drawers. In some embodiments, the interior container can have a combination of right and/or left side drawers, such as drawers 42, 44, 46, 48, 50, 52, 54 as well as front sliding drawers such as draws 53a-c, 55a-c.

Figure 6A:
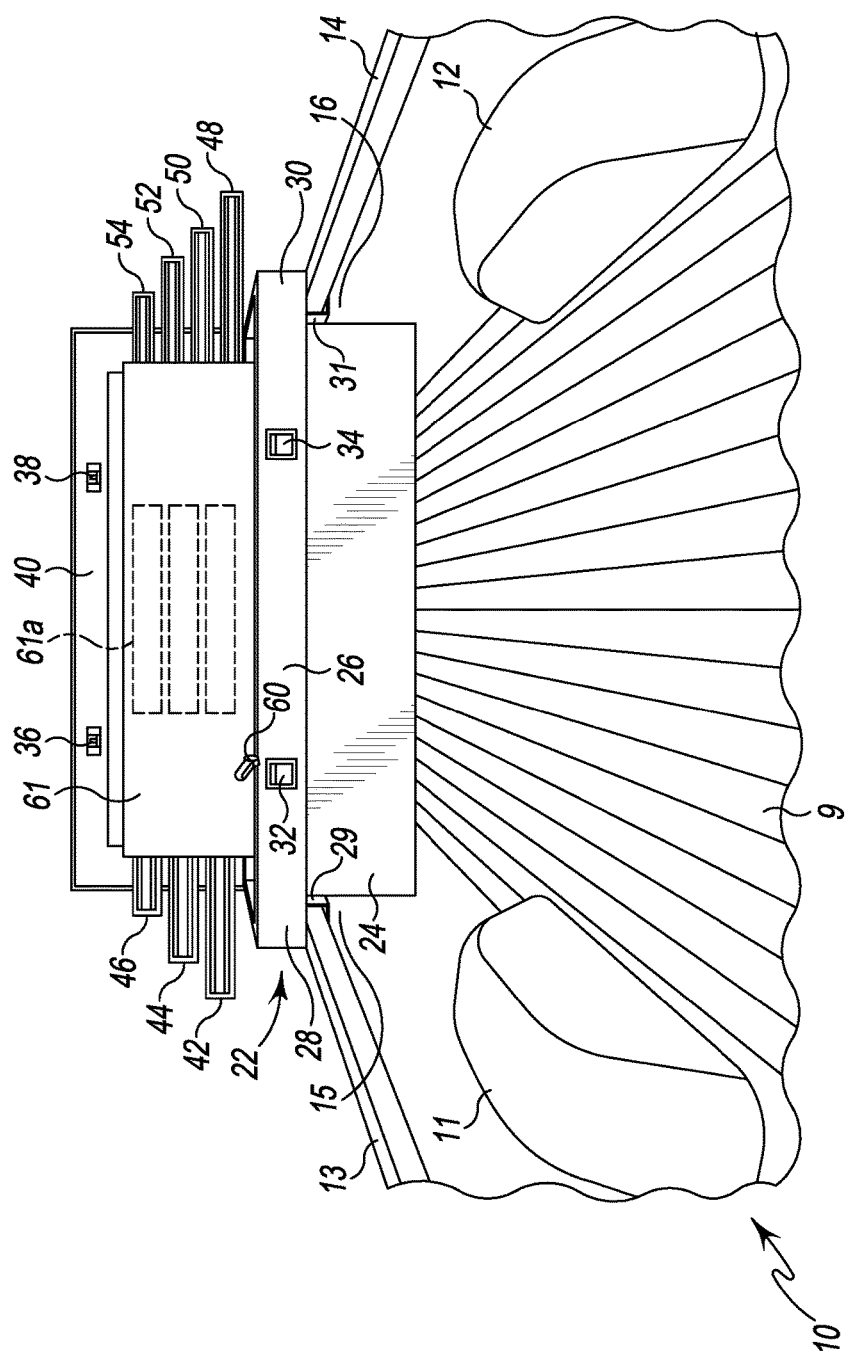
FIG. 6A is a front view of the storage device of FIG. 1 with a third embodiment interior container.

A third embodiment interior container 61 is shown in FIG. 6A, the left and right side drawers are shallower, and one set of front sliding drawers 61a is centered between the right and left sides of the interior container. Therefore the interior container can have right 48, 50, 52, 54 and left side drawers 42, 44, 46 as well as front sliding drawers 61a.

Referring to FIG. 5, the lift mechanism 131 fits laterally between the right sidewall 110 and the left side wall 112. In some embodiments, the lift mechanism does not extend into the right wing area 124 or the left wing area 122. The right wing area 124 has a right wing floor 128. The left wing area 122 has a left wing floor 126. The lower frame 144 is attached to the support blocks 105, 107 by bolts, screws, welding, adhesives, or other fasteners. The support blocks may be fixed to the floor 104 of the exterior container by bolts, screws, welding, adhesives, or other fasteners.

The lift mechanism 131 is shown in FIG. 7. The upper frame 72 comprises a front bar 132, a rear bar 130, a right side bar 134, and a left side bar 136. The bars 130, 132, 134, 136 are connected to form a rectangle. The lower frame 144 comprises a front bar 148, a rear bar 154, a right side bar 150, and a left side bar 152. The bars 148, 150, 152, 154 are connected to form a rectangle.

The upper frame 72 and the lower frame 144 are connected together by a scissor apparatus 162.

In some embodiments, the lower or upper frame or both may comprise crossmember support bars. The crossmember support bars may be perpendicular to bars 154, 148 or maybe positioned to create oblique or acute angles relative to bars 154, 148. In some embodiments, the upper frame and the lower frame have the same shape and size.

In some embodiments, each of the bars 130, 132, 134, 136, 148, 150, 152, 154 comprise an L-shape in cross-section. In some embodiments, each of the bars 130, 132, 134, 136, 148, 150, 152, 154, are rectangle, square, triangle, round, or other shape in cross-section. In some embodiments, some bars comprise one shape in cross-section, and other bars comprise another shape in cross-section.

Figure 8:
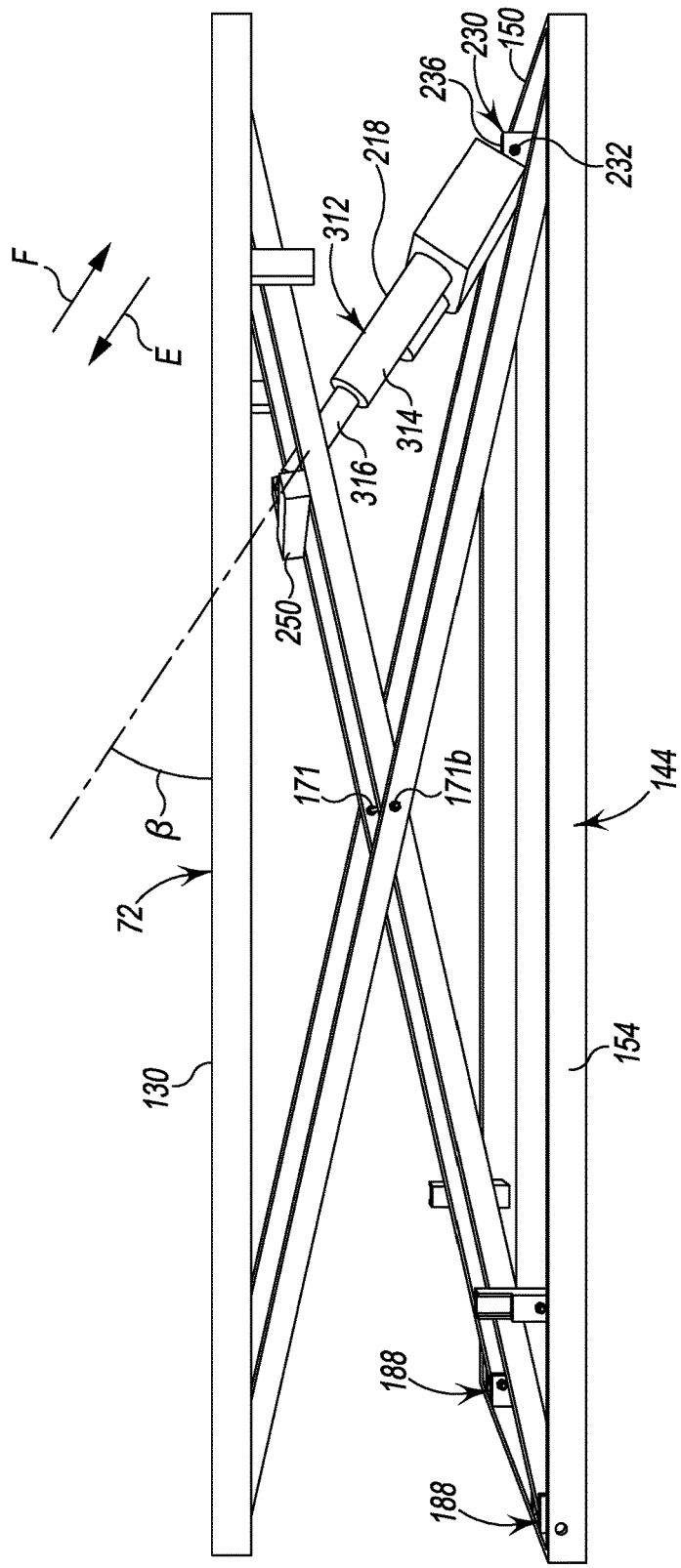
FIG. 8 is an elevation view of the lift mechanism of FIG. 7.
Figure 10:
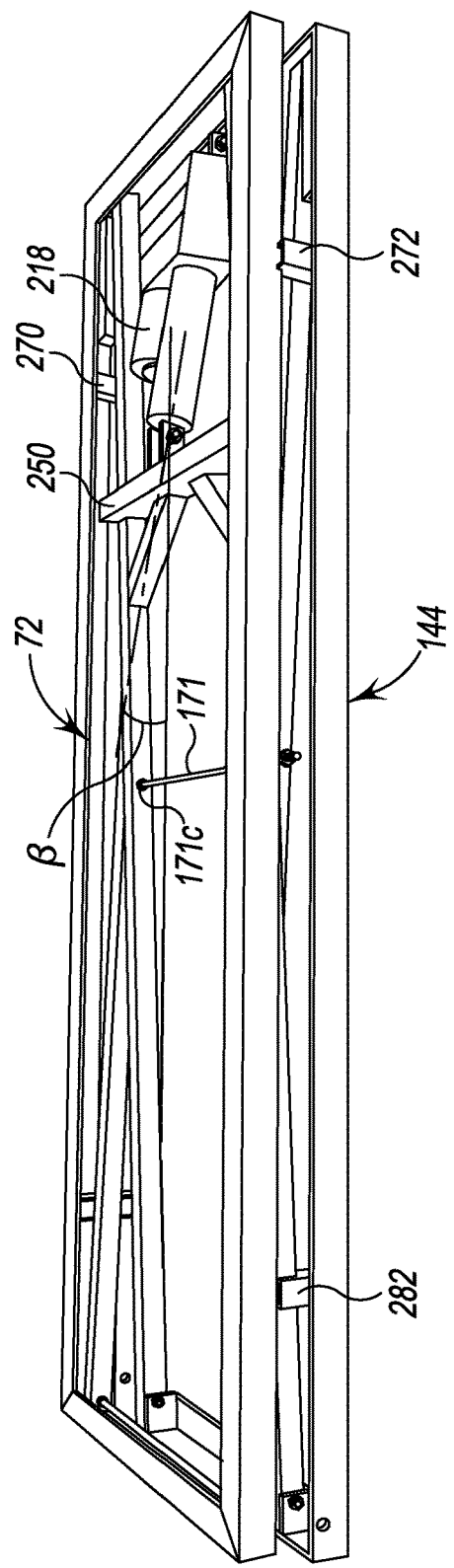
FIG. 10 is a perspective view of the lift mechanism of FIG. 7 shown in a lowered position.

The scissor apparatus 162 is shown in more detail in FIGS. 7 and 8. The scissor apparatus comprises front crossed bars 168, 170 and back crossed bars 172, 174. The crossed bars 168, 170 are pivotally connected together at about a center of their respective lengths by a rod 171 having a threaded end (not shown), an engaged nut (not shown) and a stop washer (not shown). The front crossed bars 168, 170 are captured on the rod 171 between the stop washer and the threaded nut, forming an X-shaped, first scissor mechanism 181. The back crossed bars 172, 174 are pivotally connected at about a center of their respective lengths by the rod 171 having an opposite threaded end 171a, a further engaged nut 172b and a stop washer 171c (FIG. 10). The back crossed bars 172, 174 are captured on the rod 171 between the stop washer 171c and the threaded nut 171b, forming an X-shaped, second scissor mechanism 183. The first and second scissor mechanisms are parallel and mirror image identical across a longitudinal center plane of the scissor apparatus 162, the center plane located midway between the front and rear bars 132, 130 and midway between the front and rear bars 148, 154. Thus, the two scissor mechanisms 181, 183 can simultaneously pivot about the rod 171 between a lowered position (FIG. 10) and a raised position (FIG. 8).

Left side ends of the bars 168, 172 are pivotally connected to the bar 136 of the upper frame and left side ends of the bars 170, 174 are pivotally connected to the bar 152 of the lower frame. Right side ends of the bars 170, 174 are connected to the bars 132, 130 respectively, by sliding and pivoting connections 200, 202 located adjacent to the bar 134. Right side ends of the bars 168, 172 are connected to the bars 148, 154 respectively by sliding and pivoting connections 204, 206 located adjacent to the bar 150.

The bars 168, 170, 172, 174 are each pivotally connected to the respective bars 136, 152 by a trunnion 188 formed by parallel lugs 190, 192 welded to the respective bars 136, 152 that pivotally attaches to the respective end of the bars 168, 170, 172, 174 by a through bolt 196. The four connections are substantially identical in configuration.

Figure 9:
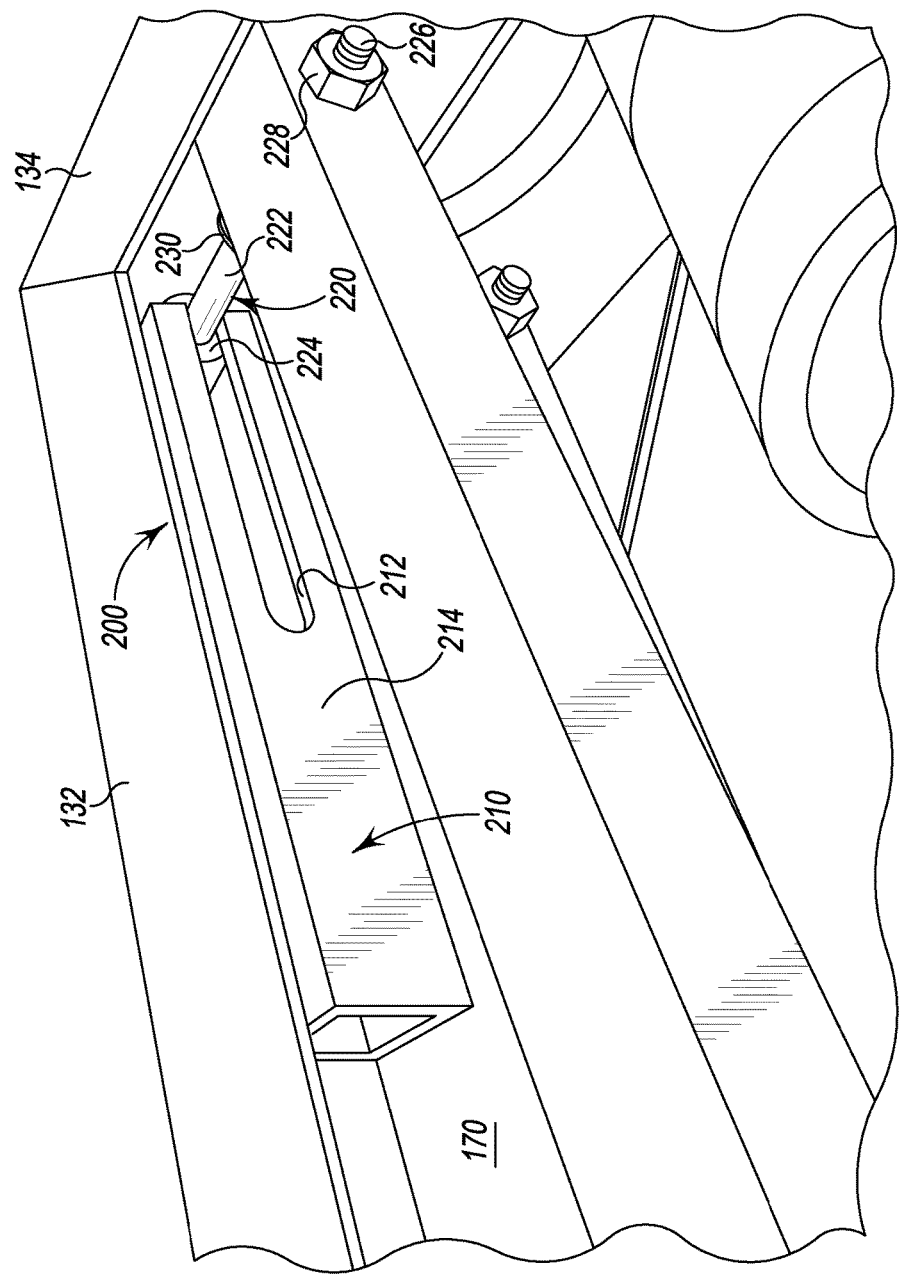
FIG. 9 is an enlarged fragmentary perspective view taken from FIG. 7.

The connection 200 is shown in FIG. 9 with the understanding that the connection 204 is substantially identical and the connections 202, 206 are mirror image identical. As shown in FIG. 9, the connection 200 provide a pivoting and sliding connection configured by a square tube 210 having a slot 212 through an inward facing sidewall 214. A bolt 220 has a shaft 222 that passes through the slot and is formed with a bolt head 224 that is captured within the square tube 210. The shaft 222 has a threaded region 226 that is fastened to the respective bar 170, 174, 148, 154 by a nut 228 and a stop washer 230, the respective bar 170, 174, 148, 154 being captured between the nut 228 and the stop washer 230 on the shaft 222 but being pivotal with respect to the tube 210 about the axis of the bolt shaft 222 and slidable along the slot 212.

At a right side of the scissor apparatus 162, a driving mechanism 218 that is configured to exert a translating force, is pivotally attached at one end by a through bolt 236 to a trunnion 230 formed by parallel lugs 232, 234 welded to the bar 150.

Figure 11:
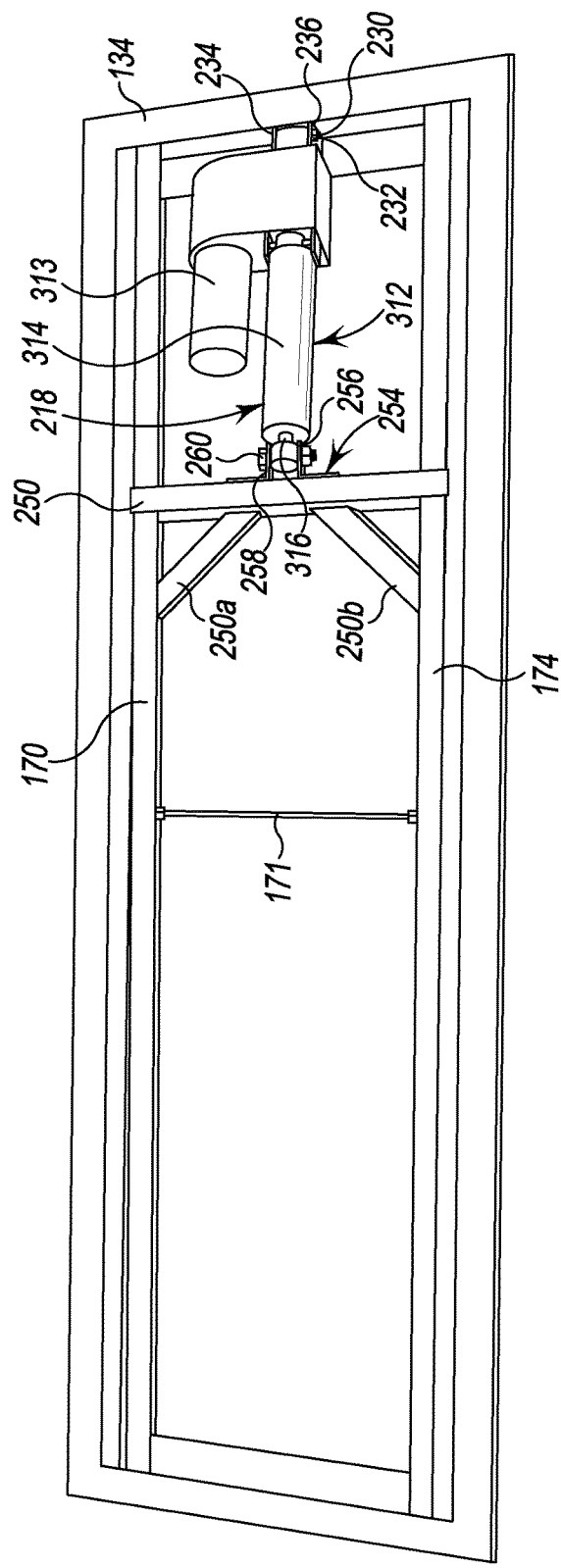
FIG. 11 is a plan view of the lift mechanism of FIG. 7 in a lowered position.

At an opposite end, the driving mechanism 218 is pivotally attached to a cross bar 250 that is attached on opposite ends to the bars 170, 174 by welding. A trunnion 254 is formed by parallel lugs 256, 258 welded to the cross bar 250 that pivotally attaches to the driving mechanism by a through bolt 260. The cross bar 250 can be additionally reinforced by a pair of oblique braces 250a, 250b welded to the cross bar at near its center-of-length and to the respective bars 170, 174 (FIG. 11). The cross bar 250 is arranged at about midway between the rod 171 and the bar 134 along the length of the bars 170, 174. The driving mechanism 218 when elongated will vertically elongate the scissor mechanisms 181, 183, and by being arranged at an oblique angle B (FIGS. 8 and 10), will exert a force on the cross bar 250 that has a horizontal and an upward vertical component.

By virtue of the driving mechanism exerting a force that has a horizontal component, the scissor mechanisms 181, 183 are actuated to vertically elongate by pivoting about the rod 171 in a scissoring movement, and by virtue of the driving mechanism exerting the force that has a vertical upward component, the scissor mechanisms are assisted in the vertical elongation which is resisted by the weight of the load on the scissor mechanisms, i.e., the weight of the interior container carried by the scissor mechanisms.

The lift mechanism 131 includes four stops, one located near each corner. The stops define the collapsed height of the scissor mechanism. Two stops 270, 272 are welded to the upper frame 72 and two stops 280, 282 are welded to the lower frame 144. When the scissor apparatus 162 is collapsed, the stop 270 which is welded to the bar 132 impacts the bar 148. The stop 272 which is welded to the bar 130 impacts the bar 154. The stop 280 which is welded to the bar 148 impacts the bar 132. The stop 282 which is welded to the bar 154 impacts the bar 130. The stops 280, 282 include a cut out region 280a, 282a that allow the stop to fit within the L-shaped profile of the bars 130, 132 when the lift mechanism 131 is collapsed.

The collapsed height of the lift mechanism 131 is set such that the drive mechanism remains at an upward inclination extending from the lower frame 144, which preserves the upward component of the force by the driving mechanism on the scissor mechanisms 181, 183. This will allow the scissor mechanisms to more easily vertically elongate from the collapsed configuration of the lift mechanism 131.

Figure 13:
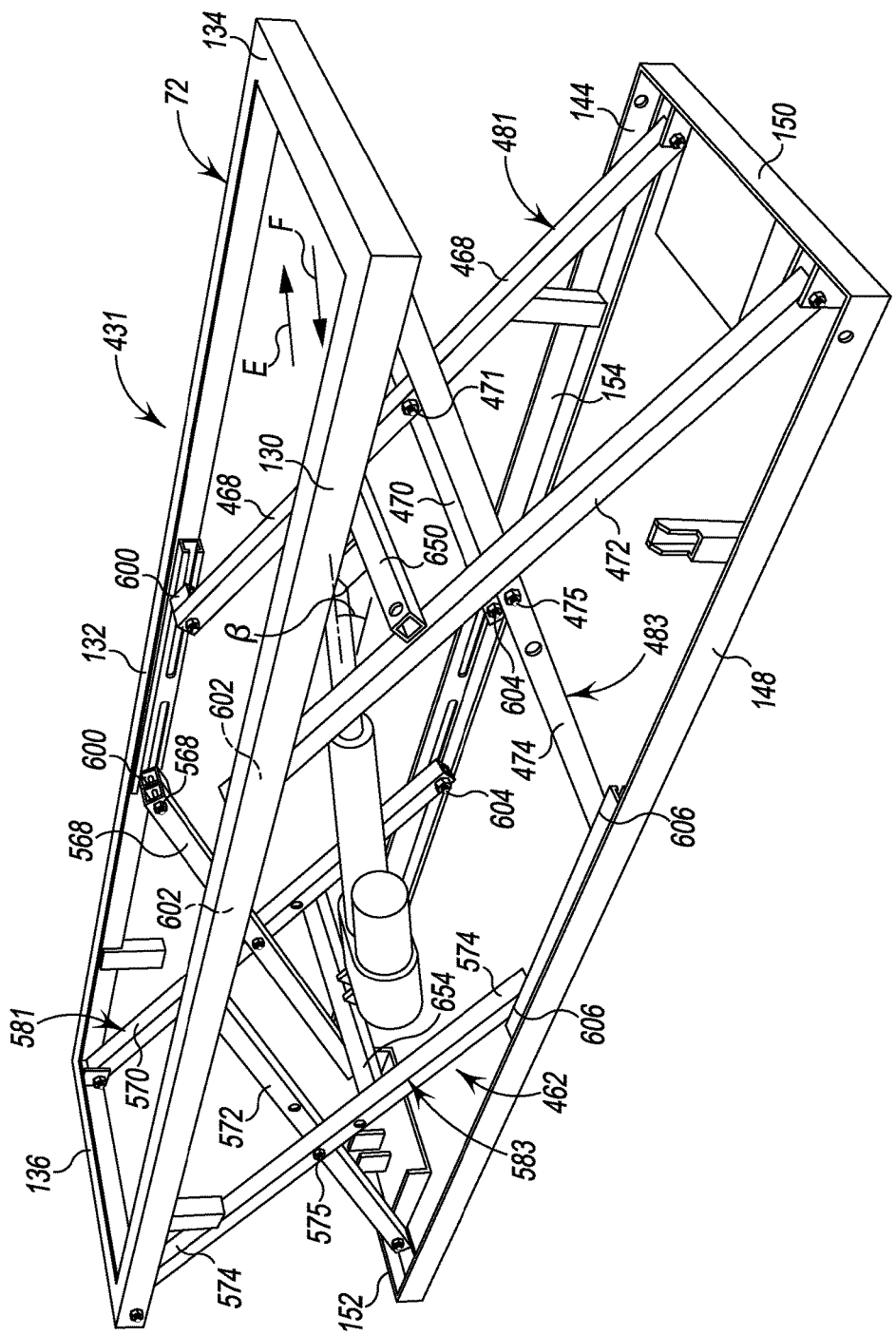
FIG. 13 is a perspective isometric view of an alternate lift mechanism of the storage device of FIG. 1, shown in an elevated position.

An alternate embodiment lift mechanism 431 is shown in FIG. 13. The lift mechanism 431 includes the upper frame 72 comprising the front bar 132, the rear bar 130, the right side bar 134, and the left side bar 136. The bars 130, 132, 134, 136 are connected to form a rectangle. The lift mechanism 431 includes the lower frame 144 comprising the front bar 148, the rear bar 154, the right side bar 150, and the left side bar 152. The bars 148, 150, 152, 154 are connected to form a rectangle.

In some embodiments, the lower or upper frame or both may comprise crossmember support bars. The crossmember support bars may be perpendicular to bars 154, 148 or maybe positioned to create oblique or acute angles relative to bars 154, 148. In some embodiments, the upper frame and the lower frame have the same shape and size.

In some embodiments, each of the bars 130, 132, 134, 136, 148, 150, 152, 154 comprise an L-shape in cross-section. In some embodiments, each of the bars 130, 132, 134, 136, 148, 150, 152, 154, are rectangle, square, triangle, round, or other shape in cross-section. In some embodiments, some bars comprise one shape in cross-section, and other bars comprise another shape in cross-section.

The upper frame 72 and the lower frame 144 are connected together by a scissor apparatus 462. The scissor apparatus 462 is shown in more detail in FIGS. 13-17. The scissor apparatus comprises a right side, X-shaped, first scissor mechanism 481 that includes front crossed bars 468, 470. The crossed bars 468, 470 are pivotally connected together at about a center of their respective lengths by a pin or bolt 475. The scissor apparatus comprises a right side, X-shaped, second scissor mechanism 483 including the back crossed bars 472, 474 pivotally connected at about a center of their respective lengths by a pin or bolt 475. The first and second scissor mechanisms 481, 483 are parallel and mirror image identical across the longitudinal center plane of the scissor apparatus 462. Thus, the two scissor mechanisms 481, 483 can simultaneously pivot about the bolts or pins 471, 475 between a lowered position (FIG. 15) and a raised position (FIG. 13).

The scissor apparatus 462 comprises a left side, X-shaped, third scissor mechanism 581 that includes front crossed bars 568, 570. The crossed bars 568, 570 are pivotally connected together at about a center of their respective lengths by a pin or bolt 571. The scissor apparatus comprises a left side, X-shaped, fourth scissor mechanism 583 including the back crossed bars 572, 574 pivotally connected at about a center of their respective lengths by a pin or bolt 575. The first and second scissor mechanisms 581, 583 are parallel and mirror image identical across the longitudinal center plane of the scissor apparatus 462. Thus, the two scissor mechanisms 581, 583 can simultaneously pivot about the bolts or pins 571, 575 between a lowered position (FIG. 15) and a raised position (FIG. 13).

Right side ends of the bars 470, 474 and left side ends of the bars 570, 574 are pivotally connected to the bars 132, 130 respectively of the upper frame 72. Right side ends of the bars 468, 472 are pivotally connected to the bar 150 of the lower frame. Left side ends of the bars 568, 572 are pivotally connected to the bar 152 of the lower frame 144.

The bars 468, 472 are each pivotally connected to the bar 150 by the trunnion 188 formed by parallel lugs 190, 192 welded to the bar 150 that pivotally attaches to the respective end of the bars 468, 472 by a through bolt 496. The bars 568, 572 are each pivotally connected to the bar 152 by the trunnion 188 formed by parallel lugs 190, 192 welded to the bar 152 that pivotally attaches to the respective end of the bars 568, 572 by a through bolt 496. The four connections are substantially identical in configuration.

The bars 470, 474 are each pivotally connected to the respective bar 132, 130 by a spacer block 606 welded to the respective bar 470, 474 and the respective bar 470, 474 and spacer block 606 are pivotally connected to the respective bar 130, 132 by a through bolt or pin 607. The four pivotal connection between the bars 470, 570 and the bar 132 and the bars 474, 574 and the bar 130 are substantially identical in configuration, and mirror image across the longitudinal center plane of the scissor apparatus 462.

Left side ends of the bars 468, 472 and right side ends of the bars 568, 572 are pivotally and slidably connected to the bars 132, 130 respectively of the upper frame 72 by sliding and pivoting connections 600, 602. Left side ends of the bars 470, 474 and right side ends of the bars 570, 574 are pivotally and slidably connected to the bars 148, 154 respectively of the lower frame 144 by sliding and pivoting connections 604, 606.

Figure 14:
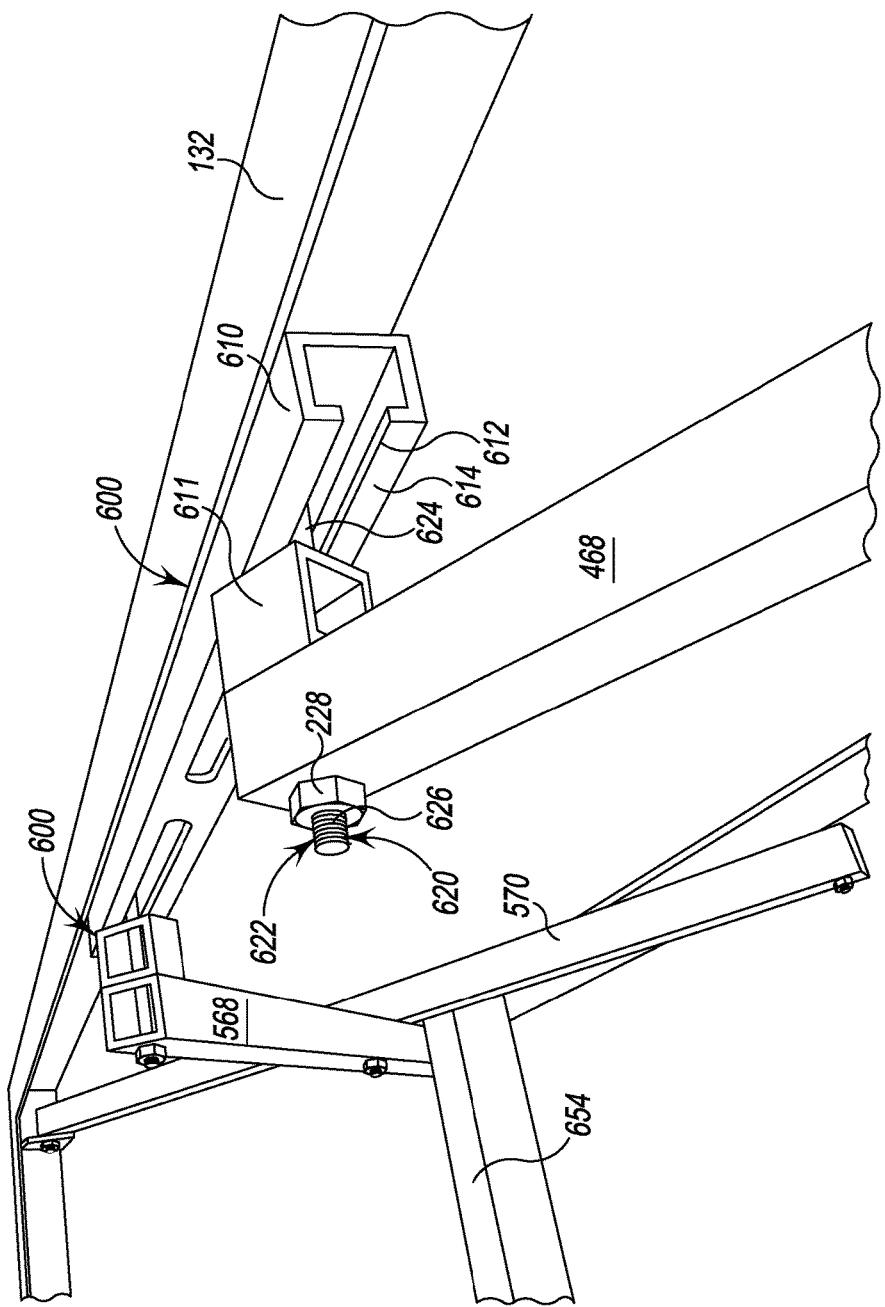
FIG. 14 is an enlarged fragmentary perspective view taken from FIG. 13.
Figure 15:
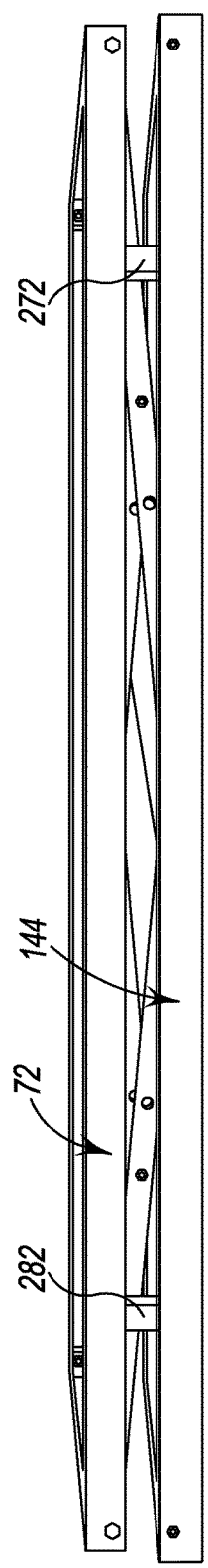
FIG. 15 is a rear view of the lift mechanism of FIG. 13 shown in a lowered position.
Figure 16:
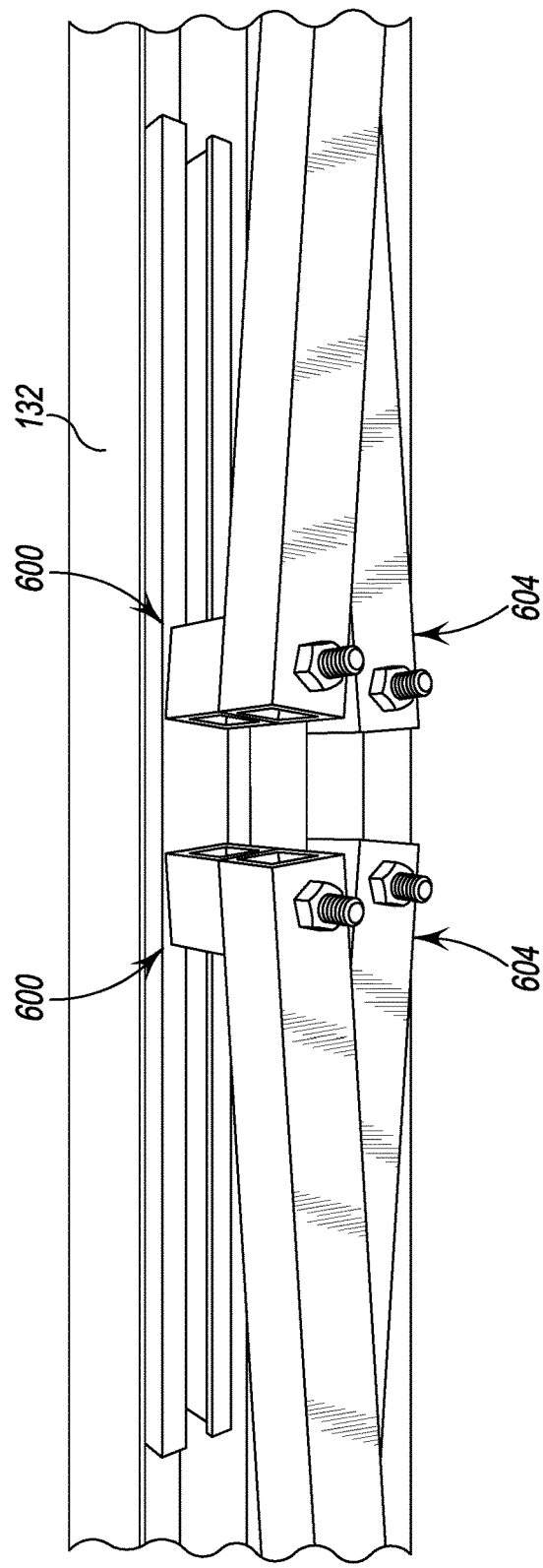
FIG. 16 is an enlarged fragmentary perspective view taken from FIG. 15.

The connections 600 is shown in FIG. 14 with the understanding that the connections 604 are substantially identical and the connections 602, 606 are mirror image identical to the connections 600, 604 across the longitudinal vertical center plane of the lift apparatus.

As shown in FIG. 14, the connection 600 provide a pivoting and sliding connection configured by a square tube 610 having a slot 612 through an inward facing sidewall 614. Each bar 470, 474, 468, 472, 570, 574, 568, 572 has a spacer 611 attached thereto placed against the sidewall 614. A bolt 620 has a shaft 622 that passes through the slot and is formed with a bolt head 624 that is captured within the square tube 610. The shaft 622 has a threaded region 626 that passes through a hole through the spacer 611 and the respective bar 470, 474, 468, 472, 570, 574, 568, 572 and is fastened to the respective bar 470, 474, 468, 472, 570, 574, 568, 572 by a nut 228, the respective bar 470, 474, 468, 472, 570, 574, 568, 572 and respective spacer 611 being captured between the nut 228 and the sidewall 614 but being pivotal with respect to the tube 610 about the axis of the bolt shaft 622 and slidable along the slot 612.

Thus, the four scissor mechanisms 481, 483, 581, 583 can simultaneously pivot about the bolts or pins 471, 475, 571, 575 in a scissoring movement to move between a lowered position (FIG. 15) and a raised position (FIG. 13).

A first cross bar 650 is attached at its ends to the bars 468, 472 at a position on the bars between the connections 600, 602 and the pins 471, 475. A second cross bar 654 is attached at its ends to the bars 570, 574 at a position on the bars between the connections 604, 606 and the pins 571, 575.

Between the right side scissor mechanisms 481, 483 and the left side scissor mechanisms 581, 583 of the scissor apparatus 462, a driving mechanism 218 is pivotally attached at one end to a trunnion 660 formed by parallel lugs 662, 664 welded to the first cross bar 650, by a through bolt 236.

At an opposite end, the driving mechanism 218 is pivotally attached to the second cross bar 654 by a trunnion 674 is formed by parallel lugs 676, 678 welded to the cross bar 654 that pivotally attaches to the driving mechanism by a through bolt 780. The driving mechanism 218 is configured to exert a translating or linear force, and when elongated will cause sliding of the respective bars 468, 470, 472, 474, 568, 570, 572, 574 at the connections 600, 602, 604, 606 as the cross bars 650, 654 are forced further apart and the resultant scissoring action of the four scissor mechanisms 481, 483, 581, 583 will vertically elongate the scissor mechanisms 481, 483, 581, 583. Also, by the driving mechanism extendable member being arranged at an oblique angle B, the driving mechanism exerts a force on the first cross bar 650 that has a horizontal and an upward vertical component.

By virtue of the driving mechanism exerting a force that has a horizontal component, the scissor mechanisms 481, 483, 581, 583 are actuated to vertically elongate by pivoting about the pins 471, 475, 571, 575 in a scissoring movement, and by virtue of the driving mechanism exerting the force that has a vertical upward component, the scissor mechanisms are assisted in the vertical elongation which is resisted by the weight of the load on the scissor mechanisms, i.e., the weight of the interior container carried by the scissor mechanisms.

The scissor mechanism 483 and its connections are configured in mirror image fashion to the scissor mechanism 481 across the vertical longitudinal center plane of the scissor apparatus 462. The vertical longitudinal center plane of the scissor apparatus 462 is the same as a vertical longitudinal center plane of the lift mechanism 431. The scissor mechanism 581 and its connections are configured in mirror image fashion to the lift mechanism 481 across a vertical transverse center plane of the scissor apparatus 462. The vertical transverse center plane of the scissor apparatus 462 is midway between the right bar 134 and the left bar 136 of the upper frame 72, and midway between the right bar 150 and the left bar 152 of the lower frame 144. The vertical transverse center plane of the scissor apparatus 462 is the same as the vertical transverse plane of the lift mechanism 431. The scissor mechanism 583 and its connections are configured in mirror image fashion to the scissor mechanism 581 across the vertical longitudinal center plane of the scissor apparatus 462.

As per the previously described embodiment, the lift mechanism 431 includes the four stops, one located near each corner. The stops define the collapsed height of the scissor mechanism. Two stops 270, 272 are welded to the upper frame 72 and two stops 280, 282 are welded to the lower frame 144. When the scissor apparatus 462 is collapsed, the stop 270 which is welded to the bar 132 impacts the bar 148. The stop 272 which is welded to the bar 130 impacts the bar 154. The stop 280 which is welded to the bar 148 impacts the bar 132. The stop 282 which is welded to the bar 154 impacts the bar 130. The stops 280, 282 include a cut out region 280*a*, 282*a* that allow the stop to fit within the L-shaped profile of the bars 130, 132 when the lift mechanism 431 is collapsed.

The collapsed height of the lift mechanism 431 is set such that the drive mechanism remains at an upward inclination extending from the cross bar 652 to the cross bar 650, which preserves the upward component of the force by the driving mechanism on the scissor mechanisms 481, 483. This will allow the scissor mechanisms to more easily vertically elongate from the collapsed configuration of the lift mechanism 431.

Figure 17:
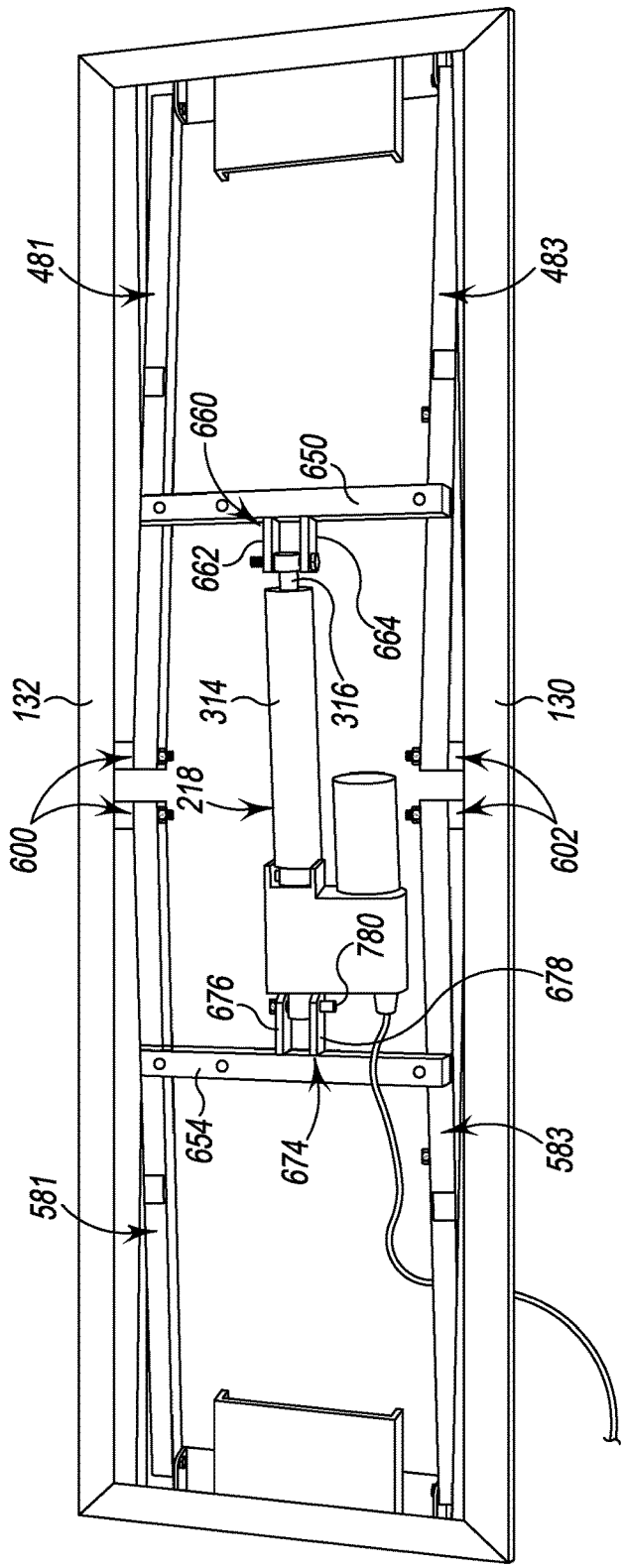
FIG. 17 is a plan view of the lift mechanism of FIG. 15.

The drive mechanism 218 for either of the above described embodiments can comprise a linear actuator 312. The linear actuator comprises a cylinder 314 and a rod 316 (FIGS. 8, 11 and 17). The rod 316 is pivotally connected to the cross bar 250 by the trunnion 254, 260 and the cylinder is pivotally connected to the bar 150 of the lower frame or to the cross bar 654.

In some embodiments, the linear actuator 312 is a screw type linear actuators, where a screw (not shown) within the cylinder 314 is driven by a motor, such as an electric motor 313. There can be gearing between the motor and the screw (not shown). The screw pushes and pulls the rod 316 depending on the direction of rotation of the screw by the motor.

The motor 313 can be connected to a power source, such as a vehicle battery, by a cable 219. In some embodiments, the vehicle battery or other power source is a 12 volt power source and the motor is adapted to operate from a 12 volt power source. In some embodiments, the vehicle or other power source is adapted to provide 110 volt power and the motor is adapted to operate from a 110 volt power source. The cable 219 may comprise a control switch 60. The control switch provides three positions, a raise position, a lower position and a neutral position. When in the raise position the switch causes power to be provided to the motor to cause the motor to rotate in the first direction. When in the lower position, the switch causes the power to be provided to the motor to cause the motor to rotate in a second direction opposite the first direction. In the neutral position the power switch provides no power to the motor so that the motor does not turn and the lift mechanism does not raise or lower.

The switch 60 may be located at the front of the exterior container as shown in FIGS. 1 and 5. In some embodiments, the switch 60 may be located at either the left or right side of the exterior container so that it is readily available adjacent the doors of the truck cab. In some embodiments, the switch can be located at 126 in FIG. 5 and at the same location on the opposite side. In some embodiments, two switches for controlling the motor and the lift mechanism are provided, one at each of the left and right sides of the exterior container.

While the figures show the switch is in wired communication with the battery and motor, in some embodiments the switch is within a wireless handheld device that is wireless communication with a receiver or transceiver, which is in wired control communication with the motor. Communication between the handheld device and the receiver or transceiver may comprise an authentication function on the handheld device and the receiver or transceiver for ensuring the handheld device is authorized to instruct the receiver or transceiver.

Communication between the handheld device and/or the receiver or transceiver may comprise an encryption function on the handheld device and/or the receiver or transceiver for providing encrypted communication between the handheld device and the receiver or transceiver.

In one embodiment, the power is available to the switch only when the vehicle's ignition switch is in the on condition/position. Therefore the lift mechanism can only be operated when the vehicle's ignition switch is in the on condition/position.

Alternatively, the linear actuator 312 can be a hydraulic cylinder driven and withdrawn by hydraulic pressure created by a hydraulic pump (not shown) acting on hydraulic fluid. The linear actuator 312 may also be a wheel and axle type, a cam type, a pneumatic type, or other type linear actuator. In some embodiments, a pneumatic bag is used as a linear actuator.

The lift mechanism maintains the interior container in the same orientation in the raised position, in the lowered position, and when moving between the raised position and a lowered position. Therefore the interior container does not rotate clockwise or counter-clockwise from the position shown in FIG. 1, but instead is moved vertically relative to the exterior container 22 and the truck.

The lift mechanism is configured to maintain interior container in a horizontal orientation when the scissor lift mechanism is in the raised position and when the scissor lift mechanism is in the lowered position. The lift mechanism maintains the interior container in the horizontal orientation when moving between the raised position and a lowered position.

In some embodiments, the bottom of the interior container is parallel or substantially parallel to the floor 104 of the exterior container or the bed floor 9 of the truck. The lift mechanism maintains the interior container parallel or substantially parallel to the floor 104 of the exterior container or the bed floor 9 of the truck when moving between the raised position and a lowered position In some embodiments, the lift mechanism is connected to the interior container only at the bottom of the interior container. The lift mechanism is located under the interior container to support the weight of the interior container and the contents loaded in the interior container.

In operation, when the linear actuator causes the rod 316 to extend in the direction E (FIGS. 8 and 13), the scissoring apparatus 162, 462 rises. When the linear actuator causes the rod 316 to retract in the direction F (FIGS. 8 and 13), the scissoring apparatus 162, 462 lowers.

Figure 12:
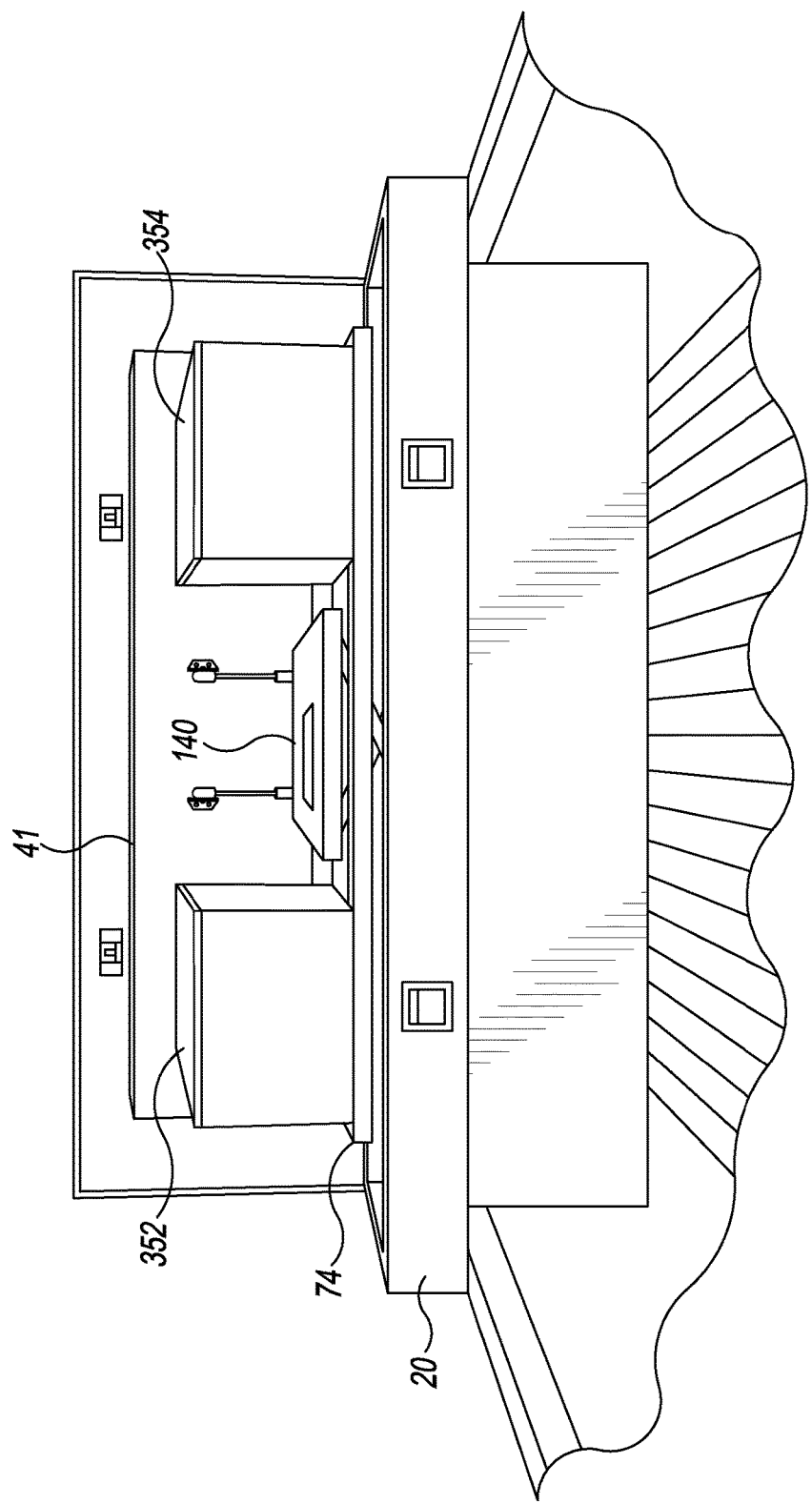
FIG. 12 is a front view of fourth embodiment interior containers of the storage device of FIG. 1.

In a fourth embodiment, the interior container 41 may comprise multiple separate interior containers, such as a left side interior container 352 and a right side interior container 354 shown in FIG. 12. In some embodiments, each container 352, 354 may comprise left and right side drawers, such as those shown with interior container 41. In some embodiments, each container 352, 354 comprises front sliding drawers, such as those shown with interior container 51. In some embodiments, each container comprises a combination of front sliding and right and/or left side sliding drawers, such as shown with interior container 61.

In some embodiments, the containers 352, 354 do not have drawers but instead have a top lid that opens to provide access to the internal space of the containers.

In some embodiments, the exterior container 22 is any conventional pickup truck bed toolbox.

In some embodiments, the lift mechanism 131, 431 and interior container 41 are provided separate from the exterior container so that it may be installed in a conventional truck bed toolbox.

The embodiments of the invention can be constructed of steel, aluminum, plastic or other appropriate materials. Where a method of attachment is specified such as by welding, it is encompassed by the invention that other methods of attachment could also be used, such as by fasteners.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A storage device for a truck bed, comprising:
   an exterior housing comprising sidewalls, a lid, a left wing, and a right wing, the left wing is configured to rest on a left side rail of the truck bed and the right wing is configured to rest on the right side rail of the truck bed so that the exterior housing extends across the truck bed adjacent a truck cab, the exterior housing providing an enclosed space when the lid is in a closed position;
   an interior container;
   a scissor lift mechanism located within the exterior housing and supporting the interior container, the scissor lift mechanism comprises a raised position and a lowered position, the interior container is within the exterior housing when the scissor lift mechanism is in the lowered position, the interior container is at least partially located outside the exterior housing when the scissor lift mechanism is in the raised position, the scissor lift mechanism maintains the interior container in a horizontal orientation when the scissor lift mechanism is in the raised position and when the scissor lift mechanism is in the lowered position;
   wherein the scissor lift mechanism comprises a lower frame, a upper frame supporting the inner container, a first bar pivotally connected to the lower frame at a first end, and pivotally and slidably connected to the upper frame at a second end, a second bar pivotally connected to the first bar at a position between the first end and the second end, and pivotally and slidably connected to the lower frame at a third end and pivotally connected to the upper frame at a fourth end;
   the scissor lift mechanism comprises a third bar pivotally connected to the lower frame at a first end, and pivotally and slidably connected to the upper frame at a second end, a forth bar pivotally connected to the third bar at a position between the first end and the second end, and pivotally and slidably connected to the lower frame at a third end and pivotally connected to the upper frame at a fourth end; the third bar and the fourth bar are arranged and configured side-by-side in mirror image fashion to the first and second bars across a vertical transverse center plane of the scissor lift mechanism;

a drive mechanism operatively connected to the scissor lift mechanism to drive the scissor lift mechanism between the lowered position and the raised position; wherein the drive mechanism comprises an actuator with an extendable member, the extendable member operatively connected at one end to the first bar at a position between the second bar and the second end, and at an opposite end operatively connected to the fourth bar at a position between the third bar and third end, wherein extension of the extendable member lifts the first bar pivotally about the first end and elevates the upper frame from the lower frame.

2. The storage device of claim 1, wherein the scissor lift mechanism maintains the interior container in the horizontal orientation when moving between the raised position and the lowered position.

3. The storage device of claim 1, wherein the interior container comprises a bottom floor and the scissor lift mechanism maintains the bottom floor in a horizontal orientation when moving between the raised position and the lowered position.

4. The storage device of claim 1, wherein the interior container comprises a left side, a right side, and a plurality of drawers, at least one of the plurality of drawers is located on the left side and at least one of the plurality of drawers is located on the rights side.

5. The storage device of claim 1, wherein the interior container comprises a left side, a right side, a front face and a plurality of drawers, at least one of the plurality of drawers is located on the front face.

6. The storage device of claim 1, wherein the interior container comprises a left side, a right side, a front face and a plurality of drawers, at least one of the plurality of drawers is located on each of the front face, the left side, and the right side.

7. The storage device of claim 1, wherein the drive mechanism comprises a motor operatively connected to the scissor lift mechanism through a gearing.

8. The storage device of claim 1, wherein the drive mechanism comprises a linear actuator connected to the scissoring mechanism.

9. The storage device of claim 1, wherein the drive mechanism is pivotally connected to the first bar and to the fourth bar.

10. The storage device of claim 9, wherein the extendable member is inclined upward from the fourth bar toward the first bar when the upper frame is in the lowered position.

11. The storage device of claim 9, wherein the interior container comprises a plurality of interior containers each operatively connected to the scissor lift mechanism.

12. The storage device of claim 1, wherein the extendable member comprises a shaft extendable from a cylinder, the shaft pivotally operatively connected to the first bar.

13. The storage device of claim 12, comprising a left clamp and a right clamp, the left clamp extending from the left wing and configured to extend under the left side rail of the truck bed, the right clamp extending from the right wing and configured to extend under the right rail of the truck bed.

14. The storage device of claim 1, wherein the scissor lift mechanism further comprises a fifth bar and a sixth bar, arranged and configured in mirror image fashion to the first and second bars across a vertical longitudinal center plane of the scissor lift mechanism, the fifth and sixth bars acting in parallel with the first and second bars to raise and lower the upper frame.

15. The storage device of claim 1, wherein the scissor lift mechanism further comprises a fifth bar and a sixth bar, arranged and configured in mirror image fashion to the first and second bars across a vertical longitudinal center plane of the scissor lift mechanism, the fifth and sixth bars acting in simultaneously with the first and second bars to raise and lower the upper frame; and, wherein the scissor lift mechanism further comprises a seventh bar and an eighth bar, arranged and configured in mirror image fashion to the third and fourth bars across a vertical longitudinal center plane of the scissor lift mechanism, the seventh and eighth bars acting simultaneously with the first and second bars to raise and lower the upper frame.

16. A tool box for a truck bed, comprising:
an exterior housing comprising sidewalls, a lid, the exterior housing configured to extends across the truck bed adjacent a truck cab, the exterior housing providing an enclosed space when the lid is in a closed position;
an interior container;
a scissor lift mechanism located within the exterior housing and supporting the interior container, the scissor lift mechanism comprises a raised position and a lowered position, the interior container is within the exterior housing when the scissor lift mechanism is in the lowered position, the interior container is at least partially located outside the exterior housing when the scissor lift mechanism is in the raised position, the scissor lift mechanism maintains the interior container in the same orientation when in the raised position, when in the lowered position, and when moving between the raised position and the lowered position;
wherein the scissor lift mechanism comprises a lower frame, a upper frame supporting the interior container, a first bar pivotally connected to the lower frame at a first end, and pivotally and slidably connected to the upper frame at a second end, a second bar pivotally connected to the first bar at a position between the first end and the second end, and pivotally and slidably connected to the lower frame at a third end and pivotally connected to the upper frame at a fourth end;
the scissor lift mechanism comprises a third bar pivotally connected to the lower frame at a first end, and pivotally and slidably connected to the upper frame at a second end, a forth bar pivotally connected to the third bar at a position between the first end and the second end, and pivotally and slidably connected to the lower frame at a third end and pivotally connected to the upper frame at a fourth end; the third bar and the fourth bar are arranged and configured side-by-side in mirror image fashion to the first and second bars across a vertical transverse center plane of the scissor lift mechanism;
a drive mechanism operatively connected to the scissor lift mechanism to drive the scissor lift mechanism between the lowered position and the raised position; wherein the drive mechanism comprises an actuator with an extendable member, the extendable member operatively connected at one end to the first bar at a position between the second bar and the second end, and at an opposite end operatively connected to the fourth bar at a position between the third bar and third end, wherein extension of the extendable member lifts the first bar pivotally about the first end and elevates the upper frame from the lower frame.

17. The tool box of claim 16, wherein the interior container comprises a left side, a right side, and a plurality of drawers, at least one of the plurality of drawers is located on the left side and at least one of the plurality of drawers is located on the rights side.

18. The tool box of claim 16, wherein the drive mechanism is pivotally connected between the first bar and the fourth bar.

19. The tool box of claim 18, wherein the extendable member is inclined upward from the fourth bar toward the first bar when the upper frame is in the lowered position.

20. The tool box of claim 16, wherein the scissor lift mechanism further comprises a fifth bar and a sixth bar, arranged and configured in mirror image fashion to the first and second bars across a vertical longitudinal center plane of the scissor lift mechanism, the fifth and sixth bars acting in simultaneously with the first and second bars to raise and lower the upper frame; and,
   wherein the scissor lift mechanism further comprises a seventh bar and an eighth bar, arranged and configured in mirror image fashion to the third and fourth bars across a vertical longitudinal center plane of the scissor lift mechanism, the seventh and eighth bars acting simultaneously with the first and second bars to raise and lower the upper frame.

\* \* \* \* \*